United States Patent [19]

Bullock

[11] Patent Number: 4,478,140
[45] Date of Patent: Oct. 23, 1984

[54] FRYER WITH OIL CIRCULATION AND CONVEYOR

[76] Inventor: Robert F. Bullock, P.O. Box 454, Conyers, Ga. 30207

[21] Appl. No.: 404,501

[22] Filed: Aug. 2, 1982

[51] Int. Cl.³ .............................................. A47J 37/12
[52] U.S. Cl. ...................................... 99/404; 99/330; 99/356; 99/407
[58] Field of Search ................. 99/326, 342, 404, 407, 99/408, 416, 330, 329 R, 356

[56] References Cited

U.S. PATENT DOCUMENTS

| | | | |
|---|---|---|---|
| 3,210,193 | 10/1965 | Martin | 99/330 X |
| 3,410,199 | 11/1968 | Quednau | 99/330 X |
| 3,585,923 | 6/1971 | Waller | 99/404 X |
| 3,614,924 | 10/1971 | Hickey | 99/404 |
| 3,637,401 | 1/1972 | Kuhlman | 99/404 X |
| 3,645,196 | 2/1972 | Johnston et al. | 99/404 |
| 3,839,951 | 10/1974 | Palmason | 99/408 X |
| 4,234,612 | 11/1980 | Sakakibara et al. | 99/404 X |

FOREIGN PATENT DOCUMENTS 727566  2/1966  Canada ................................ 99/404

Primary Examiner—Billy J. Wilhite
Assistant Examiner—Christine A. Peterson
Attorney, Agent, or Firm—James B. Middleton

[57] ABSTRACT

A fryer for cooking foods by immersing the food in heated oil. The oil is circulated through a cooking tank and through a separate heat exchanger. The rate of oil flow is fast enough to maintain turbulent flow in the heat exchanger for maximum heat transfer to the oil from the heat exchanger surfaces. High velocity oil flow in the tank provides maximum heat transfer from the oil to the food being cooked. The fryer may also include a cylindrical drum for carrying food through the cooking tank. The cooking tank will be semi-cylindrical, and food is carried by perforate shelves carried by the drum. The shelves are angled so food slides off a shelf when the shelf moves out of the tank; and, after some further rotation of the drum the shelf can receive food. The food is carried around the drum, preheated by being held over the heated oil, then moved through the oil. The drum can be loaded and unloaded from the front. A plurality of drums can be carried in one cooking tank, and each drum can be driven at a different speed to vary the cooking time on each drum.

8 Claims, 8 Drawing Figures

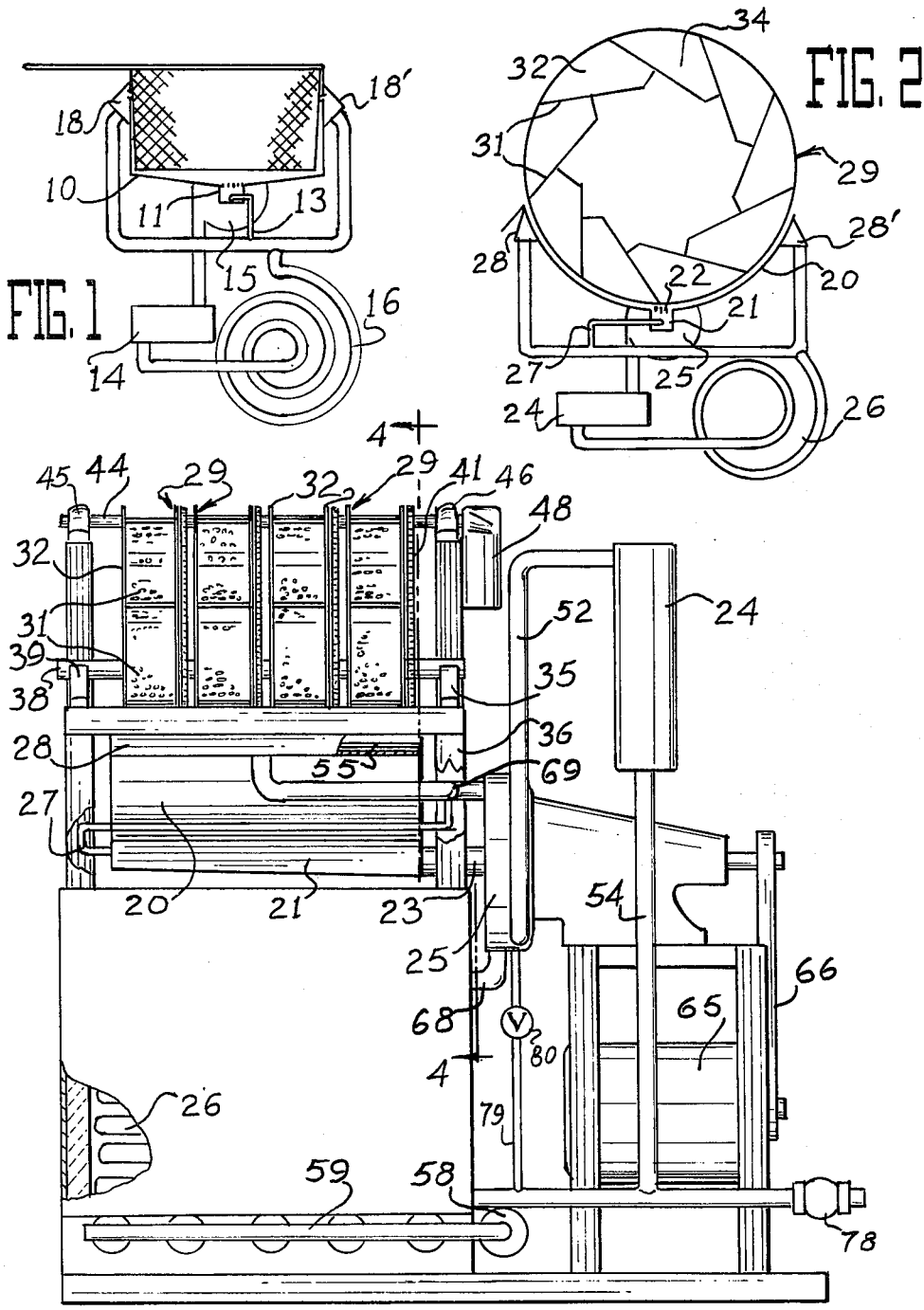

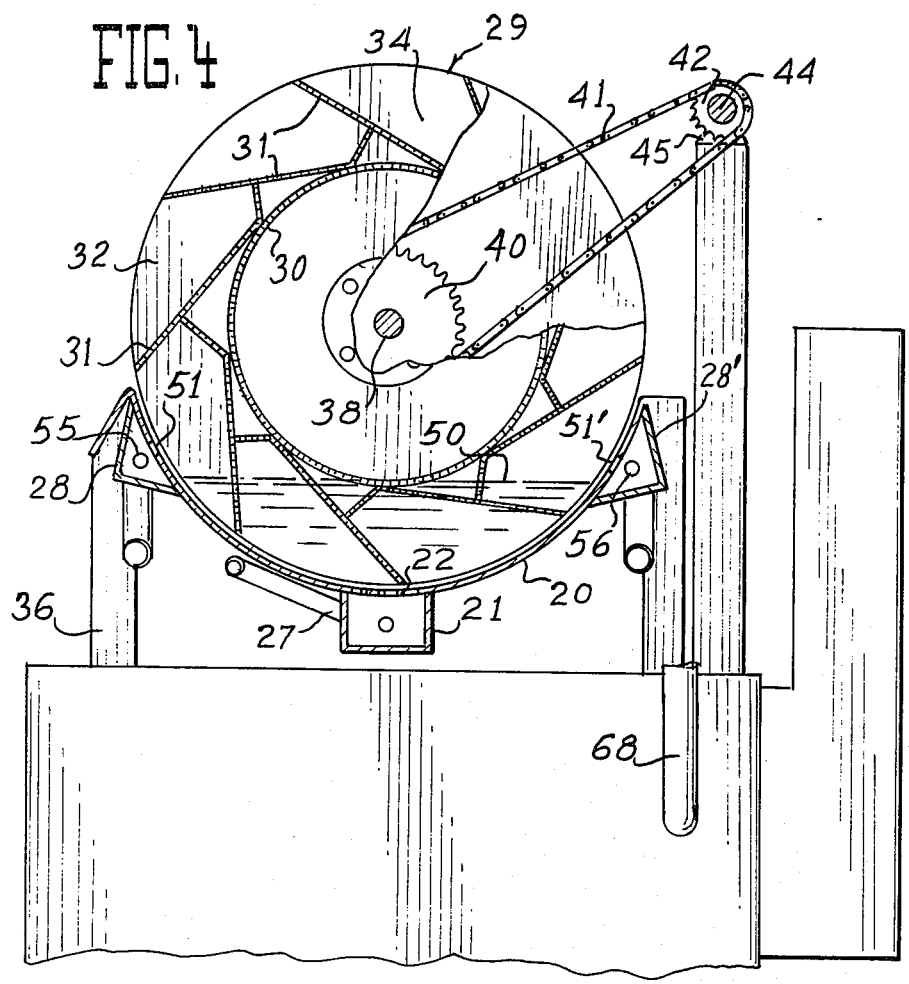
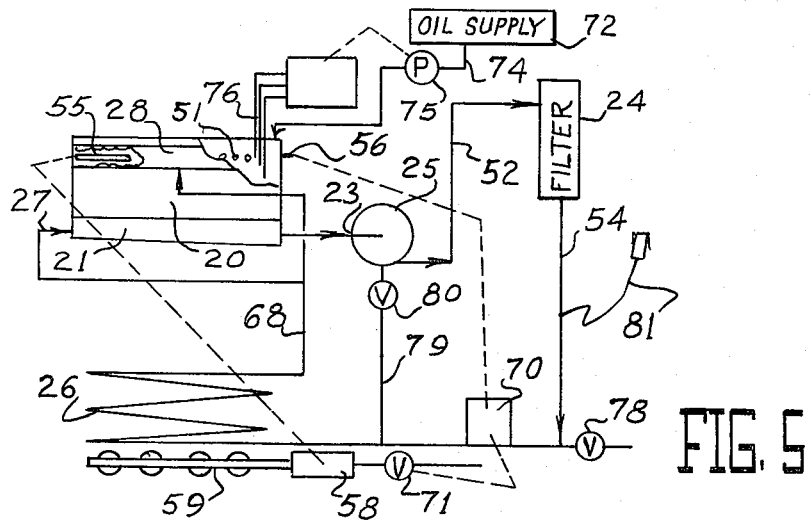

FRYER WITH OIL CIRCULATION AND CONVEYOR

FIELD OF THE INVENTION

This invention relates generally to apparatus for the deep fat frying of foods, and is more particularly concerned with a fryer having continuous oil circulation means including a heat exchanger to assure proper oil temperature, and a continuous rotary conveying means.

BACKGROUND OF THE INVENTION

There have been many efforts to improve the quality of apparatus used for deep fat frying of various foods, both in fryers of a type to be used in a restaurant or the like and in the industrial cookers used for the continuous processing of large quantities of food. It is generally recognized that the oil needs to be maintained at the appropriate temperature to obtain the proper cooking, and it is well known that the immersion of a quantity of food into heated oil causes the temperature of the oil to go down. As a result, most of the prior art efforts to improve the cookers have taken the form of an improved heating means in an effort to put more heat into the oil to raise the temperature. There have also been efforts to distribute the heat properly so more heat is available where raw cold, perhaps frozen, product is put into the oil, and less heat is used after the product has been sufficiently heated so that less heat energy is required.

The prior art efforts at solving the problem of maintaining the desired oil temperature have not been successful largely because the improved heating means have taken the form of fire tubes or electrical heating elements that are raised to a very high temperature, but the heat cannot be transferred into the oil at a sufficiently high rate to achieve the overall desired cooking temperature. The result is that the oil reaches a low temperature when new product is placed into the oil, and the temperature increases rather gradually as heat is transferred, by conduction, from the heating means to the oil that is actually cooking the food.

The deep fat fryer conventionally used in restaurants and the like takes the form of a tank of oil having heating means in the tank, and a basket for holding the food to be lowered into the heated oil. Such an arrangement is highly undesirable from several standpoints, largely because of the lack of efficiency in using such an arrangement in a restaurant. In general, one basket can be used for only one food so the utilization of the fryer is minimal. A large fryer may have two baskets or more, but a separate basket is required for each separate food, and generally for each individual portion of each food. Additionally, such fryers suffer from the above discussed disadvantages of causing the oil to drop to a low temperature when the basket is dropped into the oil, then a high temperature heating element places heat into the oil, but only as fast as the heat can be transferred by conduction through the oil with some transfer by convection currents in the oil. One attempt at solving these problems is the use of an additional temperature sensing element to determine the temperature of the oil, and this sensing element provides the information to a computing device that calculates the amount of time necessary to cook the particular food at the temperature sensed. When the calculated time has elapsed, the computing device causes the basket to be lifted from the oil. Such a device is quite expensive, but does nothing towards solving the ultimate problem, which is the low temperature of the cooking oil at the point of cooking.

A further problem in the prior art fryers is the degradation of the oil. There have been efforts to keep fryers covered to prevent the surface oxidation of the oil in an effort to reduce the loss, and there has been some filtration of oil to remove the foreign matter and allow the oil to be used for longer periods. One of the greatest problems in the degradation of the oil, however, is the overheating of the oil. Due to the extremely high temperature surfaces used in an effort to place heat into the oil, great quantities of oil are degraded very rapidly. The temperature of these surfaces is frequently around 600° F. to 1200° F. (300° C. to 650° C.), and the rate of oil degradation doubles with each 20° F. rise in temperature. As a result, it will be seen that the prior art effort at solving one problem has created another problem without really solving the first problem.

The prior art includes several forms of rotary drums used as conveyors in fryers and other food preparation devices. These prior art rotary drums have usually required loading in one specific location that would be unhandy in general use, especially in a restaurant or the like. Further, the unloading of the previous drums has been centrally of the drum, usually requiring an additional conveyor of the like. The unloading of the drum at a point that holds the cooked food over the hot oil is also undesirable since fried food has a very short acceptable life, and the vapor from the hot oil would degrade the product faster than a normal holding counter.

SUMMARY OF THE PRESENT INVENTION

The present invention overcomes the above mentioned and other difficulties with the prior art by providing a deep fat fryer including a tank of oil, a heat exchanger separate from said tank of oil, and means for passing cooking oil through the tank and through the heat exchanger at a very high rate of flow. The flow rate is sufficient that any food in the tank is constantly engaged by fresh oil that is at the desired cooking temperature. The flow through the heat exchanger is rapid, turbulent flow, and the heat exchanger has sufficient surface area to heat the oil to the desired cooking temperature even though the oil moves across the surface of the heat exchanger at a rapid rate. It is further contemplated that a fryer made in accordance with the present invention would include filtering means to remove foreign particles from the oil. The temperature sensing means will be placed so that the rapid flow of oil engages the temperature sensing means, so the temperature sensing means determines the temperature of the main current of oil.

The present invention also provides, in one embodiment, a rotary conveying system including a plurality of perforated shelves arranged for rotation about an axis. The shelves are so arranged that food is automatically discharged from the shelf by gravity as the shelf emerges from the tank; and, after a few degrees of rotation, a raw product can be placed on the same shelf. The result is that both loading and discharge of the fryer can be from the front, though of course the fryer can also be loaded from the top and back if desired. The rotary conveyor arrangement is such that two or more such conveyors can be placed within one tank of oil, and a different rotational speed on each conveyor will allow different conveyors to cook different products requiring different cooking times, with each product being cooked for the desired length of time and automatically discharged.

BRIEF DESCRIPTION OF THE DRAWINGS

These and other features and advantages of the present invention will become apparent from consideration of the following specification when taken in conjunction with the accompanying drawings in which:

FIG. 1 is a schematic illustration showing one form of fryer made in accordance with the present invention, the device of FIG. 1 including a manually operated basket for holding the food to be cooked;

FIG. 2 is a view similar to FIG. 1, but showing a rotary conveying system made in accordance with the present invention;

FIG. 3 is a front elevational view showing one embodiment of a fryer made in accordance with the present invention;

FIG. 4 is a cross-sectional view taken generally along the line 4—4 in FIG. 3;

FIG. 5 is a schematic diagram illustrating oil flow and heat control in the fryer shown in FIGS. 3 and 4;

DESCRIPTION OF THE EMBODIMENTS OF THE INVENTION

Figure 6:
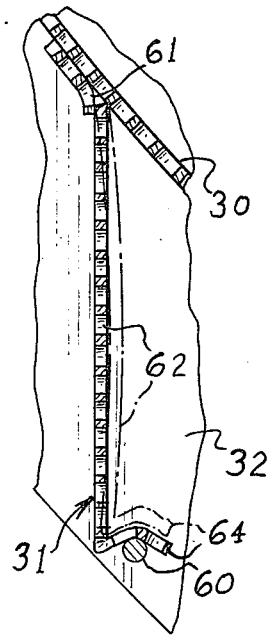
FIG. 6 is an enlarged, fragmentary view illustrating one arrangement for removably holding the shelves in the rotary conveyor of the device illustrated in FIGS. 3 and 4.

Referring now more particularly to the drawings, and to those embodiments of the invention here presented by way of illustration, attention is first directed to FIG. 1 of the drawings which is a schematic representation of one form of fryer. In FIG. 1 it will be seen that there is a tank 10 to contain a quantity of oil. A drain slot 11 extends the full width of the tank 10 and acts as a return for the oil. The drain slot 11 is perferably connected directly through a short pipe to the intake port of a pump 15.

As will be discussed in more detail hereinafter, the drain slot 11 will receive the solid particles that settle out of the oil, and these particles are passed directly into the intake side of a pump such as a centrifugal pump 15. From the pump 15, the oil is directed into a filter 14 for removal of sediment, solid particles and the like. Oil is forced through the filter 14 and into a heat exchanger 16. The heat exchanger 16 is here shown as simply a coil of pipe, it being understood that appropriate heating mean would be used to heat the oil as it passes through the length of pipe comprising the heat exchanger 16.

From the heat exchanger 16, the oil, under the pressure of the pump 15, goes into a pair of input manifolds 18 and 18' which discharge oil into the tank 10. It will also be noticed that a small pipe 13 communicates with the oil supply to the input manifolds, and connects to the drain slot 11. The arrangement is such that the oil under pressure constantly sweeps the drain slot to be sure all sediment passes into the pump, then to the filter for removal.

In considering an arrangement such as that shown in FIG. 1 of the drawings, it must be remembered that, when oil is pumped through a pipe such as that shown as the heat exchanger 16, there is usually a film of oil that coats the inside of the pipe, and this film of oil directly receives the heat applied to the outside of the pipe. This film of oil also acts somewhat as an insulator to slow heat transfer to the main stream of oil moving through the pipe. There is a similar phenomenon within the tank 10, in that the food to be cooked has a film of oil that tends to insulate the food from the balance of the oil. In the case of the food, however, the food is cold and the oil film is cold, so this film tends to prevent heating of the food.

To overcome the problems with respect to the film of oil, the present invention contemplates the use of a very high flow rate of oil. One can normally achieve laminar flow of a liquid up to a flow rate of about 12 feet per second, and it is during laminar flow that the film within the pipe is maintained. As a result, in the apparatus of the present invention it is contemplated that the flow rate will be at least 16 feet per second, one of the primary objects being to guarantee turbulent flow of the oil through the heat exchanger. When the oil is in turbulent flow, there is a tendency of the turbulence to wipe away the film of oil so that all of the oil is exposed to the pipe wall to allow heat transfer from the pipe wall to the oil.

In conventional systems that utilize either a very slow rate of flow, or convection currents only, the film of oil tends to get raised to approximately the temperature of the heating surface, which may be 600° F. to 1200° F. (300° C. to 650° C.). This temperature rapidly degrades the oil. In the present system, through the use of turbulent flow through the heat exchanger, no oil will be raised to an inordinately high temperature. With the flow rate of around 16 to 18 feet per second, the difference in temperature between the mass of the oil flowing through the pipe and the temperature of the oil at the wall of the pipe will be no more than 18° F. to 22° F.

With the foregoing in mind, it will be understood that the food in the tank 10 will be exposed to oil at the desired temperature. Since the flow rate is maintained very high, the high velocity of oil with respect to the food will tend to wipe away the film surrounding the food so the food will be constantly engaged by oil heated to the desired cooking temperature. Furthermore, due to the high flow rate, the entire volume of the tank 10 will be changed very frequently, so the oil is never appreciably lowered in temperature while in the tank 10. The result is that heat is more efficiently transferred from the heating means to the food being cooked.

Looking now at FIG. 2 of the drawings, it will be seen that the tank 20 is generally semi-cylindrical, and there is a drain slot 21 which is connected to the intake port in a pump 25. The pump 25 pumps oil into a filter 24, then to the input manifolds 28 and 28'. Again, there is a small pipe 27 providing high velocity oil to the drain slot 21 to sweep the drain slot clear. In this embodiment of the invention, it will be seen that there is a rotary conveyor generally designated at 29 including vanes, or shelves, 31 arranged along chords of the circular side plates 32.

It will be understood that the operation of the apparatus shown in FIG. 2 is generally the same as that described in conjunction with the device shown in FIG. 1 except for the food handling means. In the device illustrated in FIG. 2, it will be seen that the shelves 31 are downwardly sloped as the shelf rises from the tank 20. The drum 29 rotates clockwise as viewed in the drawings so the shelf 31 becomes horizontal shortly after the shelf rises from the tank 20, and at this point a product to be cooked can be placed on the shelf 31. The drum 29 will continue to rotate in a clockwise direction so the uncooked product is held over the tank 20 of heated oil. As a result, it will be understood that the product on one of the shelves 31, or within a pocket 34 between two shelves, will be somewhat preheated. Finally, when the pocket 34 reaches the tank 20, the product in the pocket 34 will be immersed in the oil.

It will be seen that the curved tank 20 generally matches the path of the shelves 31, so the bottom of the tank 20 closes a pocket 34 to hold the food within the pocket. The result is that motion of the drum 29 carries a food to be cooked through the tank 20, through the heated oil. At the discharge side, the product is lifted from the oil and has a short drain time, then the product is discharged by gravity.

Attention is next directed to FIGS. 3 and 4 of the drawings for an understanding of the details of construction of an embodiment of the present invention. It will be seen that the embodiment of the invention shown in FIGS. 3 and 4 is generally the same as the embodiment shown schematically in FIG. 2, so the same reference numerals will be used for the same parts.

In the embodiment here presented, it will be seen that the tank 20 is arranged with four of the rotary drums 29. Those skilled in the art will readily realize that both the width and the radius of the tank 20 can be varied considerably, and the number and size of rotary drums 29 can also be varied. Depending on the particular products to be cooked, one may utilize one single drum throughout the width of the tank 20, or very narrow drums 29 may be used and virtually any number of different drums can be used. Various combinations of widths of drum 29 can be provided depending on the particular products to be cooked, it being understood that a given product must fit within one of the pockets 34.

To support the plurality of drums 29, there is a pillow block bearing 35 fixed to the main frame 36. The bearing 35 is open so the shaft 38 can be readily placed into the bearing and removed therefrom. The shaft 38 extends completely through all of the drums 29, and sits within another bearing 39 at the opposite side of the frame 36. It will therefore be seen that the drums 29 are carried on the shaft 38, and the shaft 38 is appropriately journaled by the open bearings 35 and 39 so the shaft 38 is readily removable when desired.

Each of the drums 29 is journaled on the shaft 38 for rotation with respect thereto. Each drum 29 has a pair of flange bearings carried by the side walls 32. The flange bearings are fixed with respect to the side walls 32 so the bearing rotates with the drum 29 while the shaft 38 can remain stationary.

Outwardly of the drum 29, and fixed to one of the flange bearings, there is a sprocket 40 which is therefore fixed with respect to the drum 29 parallel to the side plates 32. A chain 41 is trained over the sprocket 40 and also over a drive sprocket 42.

The drive sprocket 42 is carried by a drive shaft 44 which is journaled at the rear of the frame 36 by bearings 45 and 46. The drive shaft 44 is driven through a gear reducer on a motor 48. The shaft 44 is, then, driven at a constant speed; and, each of the drums 29 is driven by means of a sprocket such as the sprocket 42 through a chain such as the chain 41 trained over a sprocket such as the sprocket 40 fixed to the drum 29. It will therefore be realized that the speed of each individual drum 29 can be changed by changing the ratio of its sprocket 42 to its sprocket 40. As a result, each drum 29 can be driven at a different speed if desired.

With particular attention to FIG. 4 of the drawings, it will be seen that the oil level is below the top of the tank 20, the oil level being indicated at 50. Oil is placed into the tank 20 through the manifolds 28 and 28' by means of a plurality of openings 51 and 51'. There is a row of holes 51, and a row of holes 51', extending completely across the width of the tank 20 so that oil enters the tank 20 uniformly across the width thereof. It will be remembered that the oil enters the tank 20 substantially immediately after the oil passes through the heat exchanger 26 so the oil entering the tank 20 is at the maximum desired temperature.

Though it will be obvious to those skilled in the art that temperature sensing means may be placed at virtually any point in the oil circulation system, the manifolds 28 and 28' are conveniently located and can provide for sensing of the oil temperature immediately before the oil enters the tank 20. It is contemplated that the temperature sensors will be of the type having a tubular member for sensing the temperature, and it will be seen in FIG. 4 of the drawings that there is one sensor 55 within the manifold 28 and another sensor 56 within the manifold 28'. As will be discussed in more detail hereinafter, the sensor 55 provides the information to control the heat input to the oil, and the sensor 56 provides the information to turn off the heating means in the event an extremely high temperature is detected.

Considering the drain slot 21 in more detail, and with attention to FIG. 4 of the drawings, it will be seen that the bottom portion of the tank 20 is perforated at 22 to allow material to pass from the tank 20, through the perforations 22, and into the drain slot 21. The size of the perforations 22 is quite variable; but, it should be understood that the perforations ought to be large enough to receive all the debris to be removed from the tank 20, and large enough not to be occluded by the agglomeration of flour and the like that is frequently used on fried foods.

The drain slot 21 is connected, by means of a pipe 23, to the intake side of the pump 25. To reduce the likelihood of stoppages in the line, it is preferable that the path be straight and direct as here shown, though other physical arrangements can be used.

With the pump 25 located as here illustrated, it is convenient to place the pump drive motor 65 below the pump 25 as illustrated in FIG. 4. A timing belt 66 or other drive means connects the motor 65 to the pump 25.

At the opposite end of the drain slot 21, it will be seen that there is a relatively small diameter pipe 27. The pipe 27 provides a high velocity oil flow to sweep the drain slot 21 clean and prevent the build-up of sediment.

The pump 25 has its discharge side connected through a pipe 52 to a filter 24, and a pipe 54 leads from the filter 24 to the heat exchanger 26.

The filter 24 may be any of numerous forms of readily available filters, and the internal construction is not here illustrated. Those skilled in the art will realize that, if a fryer is used to cook foods that shed only a few crumbs or the like, the filter 24 may include simple screens or the like. In the usual restaurant, however, the fryer will be used to cook great quantities of foods having flour, batter or the like, and a large amount of the flour tends to remain in the oil. It is contemplated that, for such use, the filter 24 will contain a conventional filter bag, such bags being available to remove particles down to a size of a few microns.

Further, it is conventional to use a material generally referred to as a "filter aid" to remove particles in the sub-micron range. These materials comprise a granular substance on which the impurities to be removed are adsorbed. Using the frying of the present invention, the filter aid can be placed into the oil, the filter bag removed from the filter 24, and the pump 25 operated to circulate the filter aid throughout the system. Once the filter aid has adsorbed the impurities, a filter bag can be inserted into the filter 24, and the filter aid will be removed from the system.

Those skilled in the art will realize that, when the rate of oil flow is considered along with the desired temperature of the oil, the surface area required to heat the oil to the desired temperature can be computed. Obviously, with the rapid rate of oil flow a very large surface area is required. While the precise details of the heat exchanger are not here shown, it should suffice to indicate that the heat exchanger 26 includes a coil of pipe having a plurality of convolutions of pipe, the convolutions being sufficient to give the desired length to provide the necessary surface area to obtain the desired oil temperature, considering the rate of flow and the amount of heat being put into the heat exchanger 26. Also, it is desirable to maintain the oil temperature within a very few degrees, so the heat input to the heat exchanger 26 will preferably not vary suddenly. Rather, the heat input will vary in small increments as needed to maintain, or regain, the desired temperature.

To accomplish the desired heat input to the heat exchanger 26, the sensor 55 is connected to a modulating valve 58. Modulating valves such as the valve 58 are well known in the art so no detailed description is thought to be necessary. In general, the desired temperature is set at the valve 58; and, as the temperature varies from the preset temperature, the valve 58 will gradually close or gradually open to change the amount of gas fed to the burner 59 so the amount of heat put into the heat exchanger 26 is varied only slightly when there is a small change in the demand for heat. For a large heat demand, such as potato chips, the burner 59 may become fully open to replace the heat removed from the oil; but, for a small heat demand, such as peanuts, the burner 59 may be almost off. The important feature is that the heat input is varied gradually to match the heat required to maintain the oil at a constant, preset, temperature.

Those skilled in the art will also understand that a similar arrangement can be used for an electrical heating system. Conventional Calrod electrical heating elements can be placed into the pipes comprising the heat exchanger 26, and the sensor 55 can provide an input to cause a variation in a potentiometer to change the voltage on the heating elements as required by the heating load. This would effect variations in heat input into the heat exchanger 26 to make the necessary adjustments in oil temperature.

To appreciate the foregoing description, one must consider that the conventional heating means provides a source of heat such as a gas burner or an electric heating element, and the source of heat is either "on" or "off". The thermostat to control the temperature is usually designed with rather wide variation; so, when the thermostat finally closes, the oil is at a very low temperature, relatively speaking. When the heating means is turned on, the heat transfer surfaces will become heated to a very high temperature in an effort to raise the oil temperature as quickly as possible. This causes oil degradation as was previously discussed.

The present invention therefore solves the ultimate problems by providing the rapid oil flow, and sensing the temperature of the main stream of oil. When the temperature of the oil is only a little lower than desired (2° F., or 1° C.) the burner will be turned on, but will provide only a small amount of heat. If the preset temperature is not reached, the burner will become higher until the heat input is substantially equal to the heat use. Conversely, as the oil is being heated, and the temperature approaches the desired temperature, the amount of heat being put into the heat exchanger is decreased. The result is both greater energy efficiency and less oil degradation.

The oil passes through the heat exchanger 26 and is raised to the desired temperature. The oil then leaves the heat exchanger 26 through the pipe 68. The pipe 68 supplies oil to the transverse pipe section 69 which in turn supplies oil to the two input manifolds 28 and 28'. Also, it will be seen that the pipe 27 is connected to the transverse pipe section 69 so the pipe 27 receives oil at high pressure. Of course, the relatively small diameter of the pipe 27 causes an increased velocity of oil for sweeping out the drain slot 21.

Though many forms of shelf 31 may be provided in the drum 29 made in accordance with the present invention, one such structure is shown in FIG. 6 of the drawings. Here it will be seen that there is a rod 60 extending between the side plates 32 of the drum 29, and a lip 61 is fixed to the hub 30. The shelf 31 includes a generally flat portion 62 having a flange 64 that is concave towards the rod 60. The metal for the shelf 31 will preferably be of stainless steel or a similar substance that will have sufficient spring properties that one end will be tucked under the lip 61, the main body 62 can be bowed to allow the flange 64 to pass over the pin 60; then, the portion 62 can be straightened so that the pin 60 is within the concavity of the flange 64. The shelf 31 will therefore be held between the rod 60 and the lip 61. Such an arrangement may be desirable because the shelves 31 will be easily removable so the entire drum 29 and shelves 31 can be cleaned for sanitary operation.

Attention is now directed to FIG. 5 of the drawings for a further discussion of the control of the fryer. FIG. 5 is a schematic representation of the fryer, and shows the oil circulation system and the heating means.

It will be seen that the pump 25 discharges through the pipe 52 into the filter 24, and oil leaves the filter 24 through the pipe 54. If a sufficient quantity of oil is flowing in the system, it will be understood that the pipe 54 will be maintained at a predetermined pressure. If the filter 24 is blocked, or for another reason the pressure is too low, the low pressure will be detected by a pressure switch which is connected to the control box 70.

Low pressure in the pipe line indicates that oil may not be moving through the heat exchanger 26 fast enough to prevent degradation of the oil. Thus, the control box 70 is arranged to operate the valve 71 to cut off the gas burner 59. It is also contemplated that a signal means will be energized to inform the fryer operator that there is a problem.

The sensor 55 has previously been discussed, and it will be seen in FIG. 5 of the drawings that the sensor 55 is connected to the modulating valve 58 to control the valve for the required heat input. The sensor 56 in the input manifold 28' is provided to detect excess temperatures, and the sensor 56 is here indicated as connected to the control box 70. Thus, if the temperature of the oil exceeds a predetermined temperature, the sensor 56 will detect the excess temperature, and cause the control box 70 to close the valve 71 to cut off the burner 59. Again, a signal means may be energized to indicate that there is a problem.

In a fryer constructed in accordance with the present invention, there is relatively little oil in the fryer compared to the amount of food product the fryer will cook. Those skilled in the art will be aware that all fried foods absorb some of the oil during the cooking process. Even though the carefully controlled fryer of the present invention tends to minimize oil absorption, there will always be some oil absorbed. With the ratio of oil to product cooked in the present fryer, it will be understood that the amount of oil removed by the product is a high percentage of the total oil in the system.

Because the product cooked removes a high percentage of the oil, it will be understood that regular use of the fryer of the present invention will require regular additions of oil. This is highly desirable since it results in replacement of almost all the oil in a relatively short time. Heated oil will eventually become unuseable, even when heated carefully as hereinabove discussed; however, if a significant percentage of the oil is removed regularly, the oil will not get old enough to the unuseable.

While the ratio of the oil to the product cooked is desirable for conserving oil, it will be realized that oil must be added to the system very frequently. FIG. 5 discloses an automatic system for accomplishing this task, including means for determining when oil needs to be added.

An oil supply is indicated at 72, with a line 74 leading from the oil supply to the tank 20. A pump 75 may be used if necessary, or a valve may be used in the event the oil supply 72 is located to use gravity flow. It will also be recognized that the line 74 may be connected to the pipe 23 at the intake side of the pump 25. The object is to place additional oil into the system, and the new oil can be delivered to almost any convenient point.

To determine when oil needs to be added to the system, a level indicator is used. The indicator 76 here shown schematically is in the form of a conventional sensor using three electrical contacts, the arrangement being such that a liquid connection between the highest contact and the median contact will signal the desired liquid level. Lack of a liquid connection between the lowest contact and the median contact will signal a liquid deficiency. The signals from the indicator 76 will operate the pump 75, or open appropriate valves or the like, to achieve the desired liquid level.

Another feature of the present invention is the ability to clean the device easily. For this purpose, there is a drain valve 78. As is shown in FIG. 3 of the drawings, the valve 78 is at the lowest point of the oil circulation systems, so all liquid can be drained from the system. Also, it will be seen that there is a pump drain line 79 having a valve 80 to allow the pump 25 to be completely drained.

To clean the system thoroughly, a solvent or other detergent can be placed in the system and pumped therethrough. Because a high pressure line is available, a spray hose 81 can be provided if desired. The hose 81 can be connected to the high pressure side of the pump 25, in the pipe 54, and a spray nozzle can be used to spray the entire tank and conveying apparatus, baskets or the like.

From the foregoing description, operation of the apparatus of the invention should now be understandable. A quantity of oil will be placed in the tank, and the pump 25 will be operated to fill the filter, heat exchanger, etc. The pressure switch in the oil line will prevent operation of the burner until there is enough oil flowing; but, when there is oil flowing in the system, and the temperature sensor 55 will indicate a low temperature and the burner will be turned on. The second sensor 56 is a high temperature cut-off to turn off the burner 59 in the event a problem develops and an excess temperature is reached.

Only when the oil is at the cooking temperature should food be placed into the fryer. Once this temperature is reached, it will be understood that all the oil in the system is substantially at cooking temperature, and a portion of that oil is in the cooking tank at any given time. When food is placed into the oil, the oil will be moving rapidly, so any given quantity of oil will lose only some of its heat to the food and will quickly return to be reheated to cooking temperature.

Such a system assures that the oil engaging the food is at cooking temperature, so cooking times can be accurately set. In the event baskets are used, a timer can indicate when various foods will be done. In the event the rotary conveyors 29 are used, the speed of rotation can be set to determine the cooking time.

In using the rotary conveyors 29, it will be seen in FIG. 4 of the drawings that one shelf 31 is in the earliest discharge position. This is such that the cooked product has been out of the oil a short time, so the product has drained but has not stayed over the oil long enough to degrade. The next shelf 31 (moving clockwise) can receive a product.

From this earliest loading position, the raw product will move around the conveyor, held above the hot oil so the raw product will be preheated. Finally, the product will be dipped into the oil and held. The conveyor is such that floating products such as doughnuts will be held down from the beginning, while products such as potatoes that sink will still be moved by the shelves 31.

From the above it will be seen that most of the pockets on the conveyor 29 can have a product in them. This gives excellent utilization of the fryer for high production. Also, the machine can be loaded from the front, and the cooked product will be discharged at the front for great convenience in restaurants.

The fryer of the present invention is therefore very efficient in use, and is efficient for both energy and materials. The modulating heat source allows minimum temperature on the heat exchange surface while allowing the needed quantity of heat to be transferred. This of course reduces the wasted heat from the heat source. Insulation for the heat exchanger, the tank and the piping will further reduce heat loss for even greater efficiency.

The fryer is also efficient in the use of oil because the oil will not become degraded due to the high temperatures found in prior art dryers. It is contemplated that a normal restaurant's cooking oil use will be reduced by about half, thereby effecting very noticeable savings.

The above described fryer will operate efficiently when frying foods that will remain intact on one of the shelves 31. However, some foods to be fried are prepared with a wet batter such that the batter would drip through the shelves 31 before being immersed into the oil. For this type of product an arrangement such as that shown in FIG. 7 of the drawings may be used.

Figure 7:
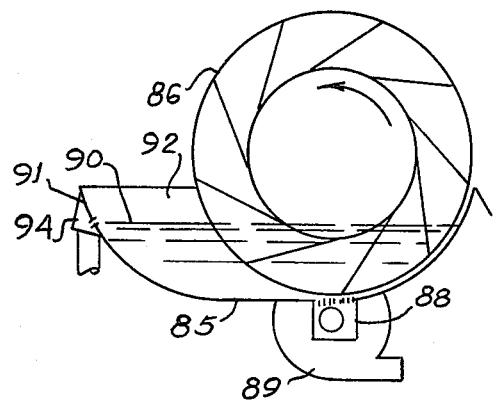
FIG. 7 is a view similar to FIGS. 1 and 2 but showing a modified form of apparatus; and, FIG. 8 is a schematic illustration showing an automatic feeding and cooking system using the fryer of the present invention.

The device shown in FIG. 7 utilizes all the above described features for oil heating, circulation, filtration and the like, and these are not shown. Those skilled in the art will readily comprehend the complete apparatus from the rather schematic illustration taken in the like of the foregoing disclosure.

When a product has a wet batter, the product must be placed into hot oil almost immediately to prevent loss of the batter. When the product has been in hot oil for a very short time, the batter will have lost enough moisture that it can be handled mechanically without damage. Thus, the fryer shown in FIG. 7 includes a tank 85 having a rotary conveyor 86 arranged as previously described. Also, there is a drain slot 88 leading to a pump 89 to discharge the sediment and circulate the oil.

The tank 85 closely conforms to the conveyor 86 from the bottom of the conveyor to the discharge point in accordance with the previous description. To the rear of the conveyor 86, however, the tank 85 extends far enough to provide an open area 90 between the rearmost wall 91 and the conveyor 86.

In the event the fryer shown in FIG. 7 includes more than one conveyor 86, a divider wall 92 will separate the open area 90 from adjacent open areas.

It should be observed that there is only one input manifold 94 shown in FIG. 7. Thus, all the oil will enter the tank 85 through the manifold 94, and the oil will move through the tank 85 to the drain slot 88. This motion will create a definite current moving from the rear wall 91 towards the conveyor 86.

In operation, a product having wet batter can be placed into the open space 90, directly into the oil. The current, or oil flow, moving towards the conveyor 86 will cause the product to move towards the conveyor 86 until one of the shelves in the conveyor engages the product. By this time, the wet batter will be set well enough to be handled mechanically. The product will be further cooked, and finally discharged.

Figure 8:
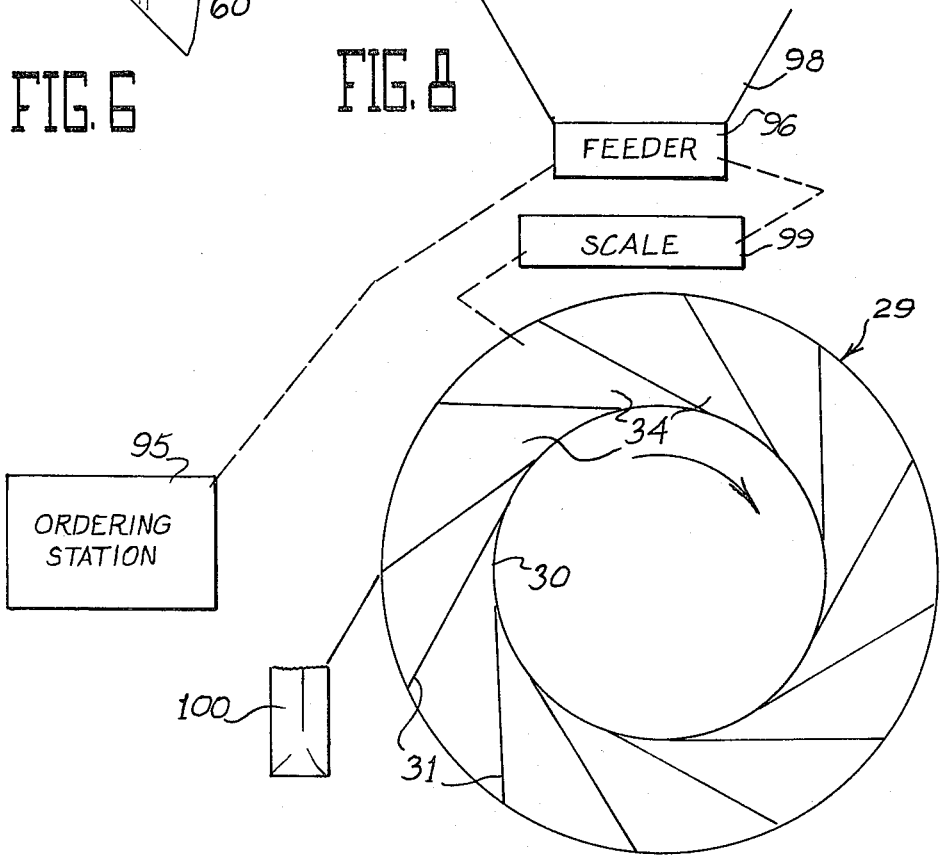

A somewhat automated version of the fryer is shown in FIG. 8 of the drawings, and here it will be seen that the drum 29 is fed from a point generally at the top of the drum 29, though this would be a matter of choice.

In the arrangement here shown schematically, orders would be placed at the ordering station 95, and this information would be fed to the product feeder 96. The product feeder 96 is connected to a hopper 98 which would contain a large quantity of the product to be cooked. When the ordering station 95 indicates that an order is to be filled, the feeder 96 would receive the information and feed a single portion of the product from the hopper 98 onto the automatic discharge scale 99. Those skilled in the art will understand that there are commercially available scales that can be set to weigh out a given quantity, and provide an electrical signal when the desired quantity is reached. Such a scale can be used and connected to the feeder so that, when the scale receives the desired portion, the feeder 96 will be turned off, and the scale can discharge the contents into a pocket 34 of the drum 29. Information as to the positioning of the drum 29 can be fed to the scale 99 by any of several conventional means. By way of example, a microswitch with a feeler can be used to be actuated by the shelves of the pockets 34, a proximity switch can be placed for actuation by the presence of a shelf, and numerous other sensing means can be easily devised by those skilled in the art.

Once a portion of the product is in one of the pockets 34, the drum 29 will rotate as previously described to cook the product, and the product will be discharged into a container 100 appropriately placed at the discharge side of the fryer.

From the foregoing, it will be readily understood that a plurality of orders can be stored electronically at the ordering station 95, or in other well known circuitry. The feeder 96 can monitor the stored orders and continue to feed additional portions as long as there are orders to be filled. The entire system can be very easily interlocked electrically so that the scale will not discharge until a pocket 34 is in place, and the feeder 96 will not begin to feed a new order until the scale 99 has discharged.

It will of course be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as defined in the appended claims.

I claim:

1. A fryer wherein food to be cooked is placed in cooking oil heated to a cooking temperature, said fryer including a generally semi-cylindrical tank for receiving a quantity of oil, a drain for discharging said oil, said drain extending along the bottom of said tank, and a manifold for supplying said oil to said tank parallel to said drain and above said bottom, a hub concentric with said tank and including a plurality of perforate shelves extending outwardly from said hub for defining pockets between adjacent shelves, the centerline of said hub being above the level of oil in said tank, said shelves being arranged to be along a chord at such angle that food lifted from said tank by a shelf will slide off the shelf when the shelf is above the tank wall, means for rotating said hub so that food will be discharged at the front of said fryer, and substantially imperforate side plates fixed to said hub, said side plates being concentric with said hub and extending generally to the bottom of said tank and enclosing the sides of said shelves, said centerline of said hub being parallel to said drain and said manifold so that oil moves generally in a direction parallel to the direction of motion of food through said tank.

2. A fryer as claimed in claim 7, and further including a second manifold for supplying oil to said tank, said second manifold being arranged parallel to said manifold, said manifold being located at one side of said tank and said second manifold being located at the opposite side of said tank, a continuously operating pump for removing oil from said drain and supplying oil to said manifold and said second manifold, the arrangement being such that oil flows from each side of said tank towards said drain, the flow being maintained between said side plates for directing oil to the food to be cooked.

3. A fryer as claimed in claim 1, and further including a plurality of said hubs, a support shaft for supporting said plurality of hubs relative to said tank, said means for rotating said hub including a drive shaft parallel to said support shaft, and drive connecting means from said drive shaft to each hub of said plurality of hubs for driving each hub independently from said drive shaft.

4. A fryer as claimed in claim 9, and including portion measuring means adjacent to said hub for depositing food in said pockets, feeder means arranged to feed food to said portion measuring means, and supply means for maintaining constant supply to said feeder means, an order station for determining portions to be cooked, said order station being arranged to actuate said feeder so long as said portions to be cooked have not been fed by said feeder means.

5. A fryer, wherein food to be cooked is placed in cooking oil heated to cooking temperature, said fryer including a tank for receiving a quantity of said oil, an input manifold for continuously supplying said oil to said tank, a drain generally at the bottom of said tank for removing said oil from said tank, a pump for continuously removing said oil through said drain, a filter in communication with said pump for receiving the oil output from said pump, and a heat exchanger for receiving oil from said filter under the pressure of said pump, said input manifold being in communication with said heat exchanger for receiving said oil from said heat exchanger and supply said oil to said tank, said pump being such as to force said oil through said tank and through said heat exchanger at a rate to assure turbulent flow of all of the oil in said tank, heating means for supplying heat to said heat exchanger, and modulating means for said heating means for varying said heating means to supply substantially that amount of heat to said oil in said heat exchanger as was removed from said oil in said tank.

6. A fryer as claimed in claim 5, said drain comprising a generally open channel extending at least a substantial portion of the length of said bottom of said tank, and including sweeping means for clearing said channel.

7. A fryer as claimed in claim 4, and further including a second input manifold, said input manifold being at a first side of said tank and said second input manifold being at a second side of said tank, said sweeping means comprising pipe means for directing high velocity oil along said channel.

8. A fryer as claimed in claim 4, temperature sensing means for sensing the temperature of said oil, and means operatively connecting said temperature sensing means to said modulating means, the arrangement being such that the quantity of heat supplied by said heating means is varied with oil temperature to maintain a generally constant oil temperature.

* * * * *

UNITED STATES PATENT AND TRADEMARK OFFICE
CERTIFICATE OF CORRECTION

PATENT NO. : 4,478,140
DATED : October 23, 1984
INVENTOR(S) : Robert F. Bullock

It is certified that error appears in the above-identified patent and that said Letters Patent are hereby corrected as shown below:

```
In claim 2, line 1, change "claim 7" to --claim 1--.
In claim 3, line 1, change "claim 1" to --claim 2--.
In claim 4, line 1, change "claim 9" to --claim 3--.
In claim 7, line 1, change "claim 4" to --claim 6--.
In claim 8, line 1, change "claim 4" to --claim 6--.
```

Signed and Sealed this

Sixteenth Day of April 1985

[SEAL]

Attest:

DONALD J. QUIGG

*Attesting Officer*     *Acting Commissioner of Patents and Trademarks*